Figure 1:
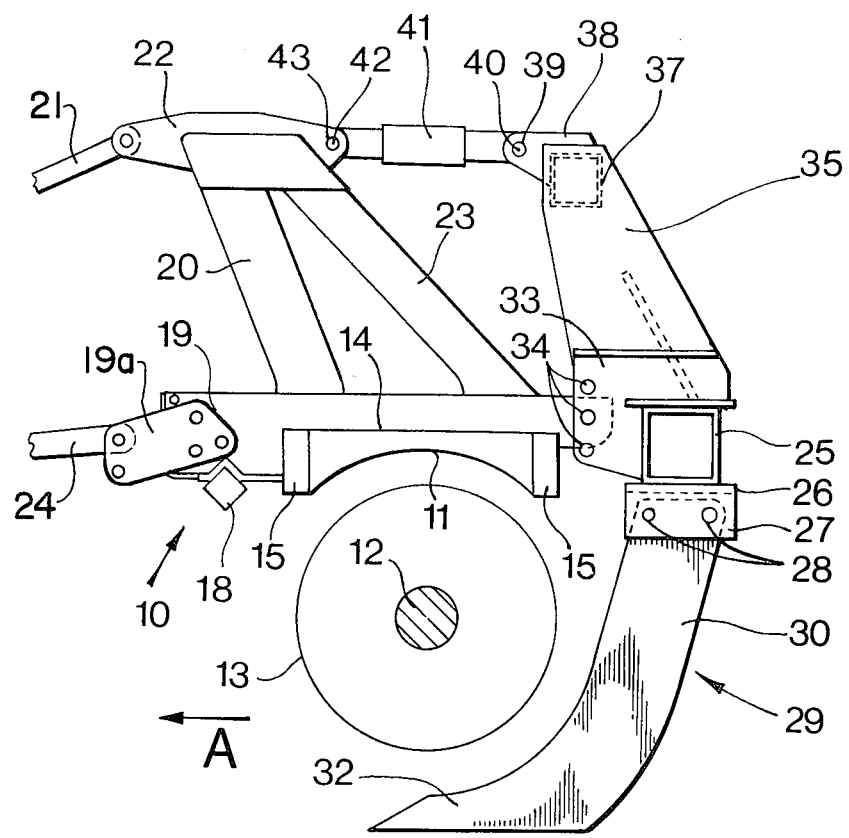

United States Patent
North

[11] 3,931,858
[45] Jan. 13, 1976

[54] CULTIVATING MACHINE
[75] Inventor: Bernard C. North, Earsham, near Bungay, England
[73] Assignee: Howard Machinery Limited, Saxham, Bury St. Edmunds, England
[22] Filed: Mar. 14, 1974
[21] Appl. No.: 450,977

[30] Foreign Application Priority Data
   Mar. 20, 1973   United Kingdom............. 13209/73

[52] U.S. Cl. .................. 172/63; 172/196; 172/443
[51] Int. Cl.² .................. A01B 33/16; A01B 49/02
[58] Field of Search ......... 172/196, 63, 65, 66, 699, 172/443, 71, 156

[56] References Cited
UNITED STATES PATENTS

| | | |
|---|---|---|
| 1,880,113 | 9/1932 | Smith.................................. 172/65 |
| 2,445,145 | 7/1948 | Love................................ 172/443 X |
| 2,539,136 | 1/1951 | Hite................................... 172/65 X |
| 3,002,574 | 10/1961 | Padrick................................ 172/699 |
| 3,185,220 | 5/1965 | Tanque................................. 172/66 |
| 3,190,365 | 6/1965 | Thompson...................... 172/274 X |
| 3,698,485 | 10/1972 | Trimpe................................. 172/65 |

*Primary Examiner*—Stephen C. Pellegrino
*Attorney, Agent, or Firm*—Wegner, Stellman, McCord, Wiles & Wood

[57] ABSTRACT

A tractor-mounted cultivator is combined with a frame on which fixed cultivating tools are mounted. The fixed tools extend behind the rotary cultivator to break up ground below the level of rotary cultivation. The frame is releasably attached to the rotary cultivator and the attachment means are such that the frame can be used independently by direct attachment to the tractor three-point linkage.

8 Claims, 4 Drawing Figures

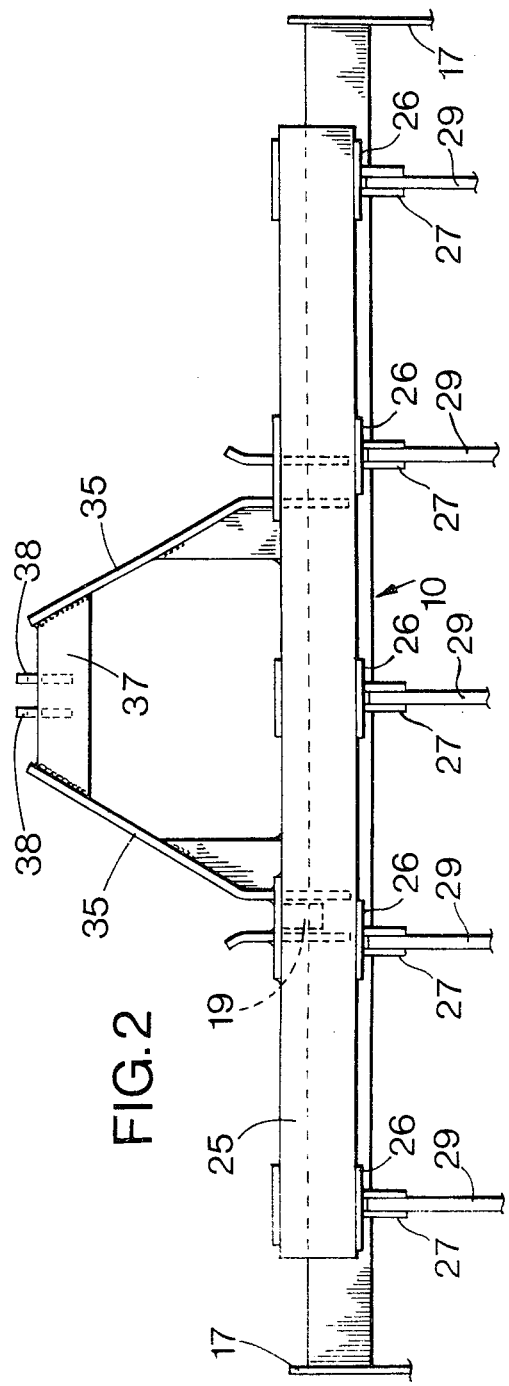
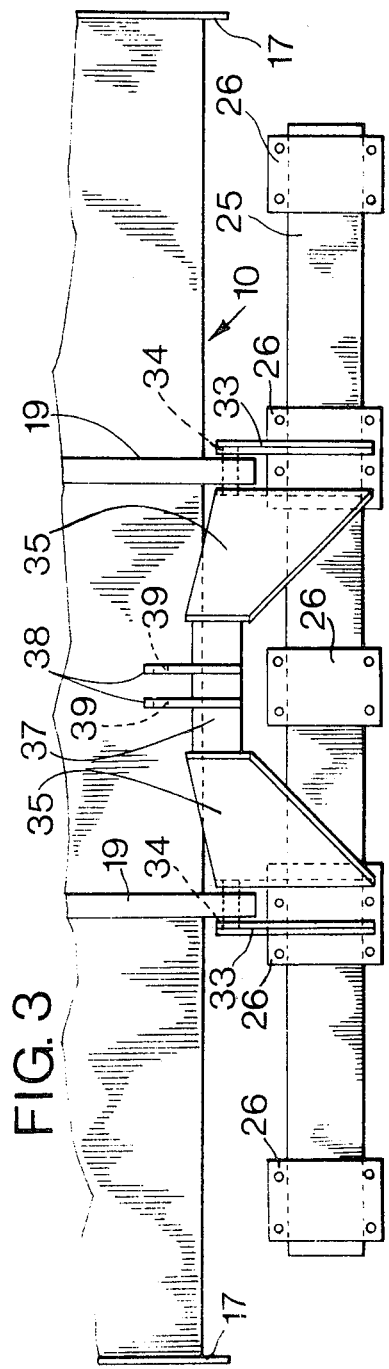

CULTIVATING MACHINE

This invention relates to a cultivating machine and particularly to a cultivating machine to be carried on a tractor during operation and drawn through the ground to break up the soil.

It has been proposed to fit fixed cultivating tines to rotary cultivators to help break up the ground and to cultivate the ground below the level at which the rotary cultivator tools are operated. Such tines have been fitted to a frame forming part of the rotary cultivator structure.

An object of the invention is to provide a cultivating machine including a rotary cultivator and having fixed tines which can be readily fitted to and 45 from the rotary cultivator.

According to the invention a cultivating machine comprises a rotary cultivator arranged to be supported by a tractor three point linkage and including a rotor carrying cultivating tools and a rotor frame supporting said rotor, and combined with the rotary cultivator, a releasable frame carrying fixed cultivating tools, and attachment means for releasably attaching the releasable frame to the rotor frame so that the fixed tools extend to the rear of said rotor, and the attachment means being arranged for attaching said releasable frame direct to a tractor three point linkage when released from the rotor frame.

Preferably the machine comprises upper attachment means on the rotor frame for attaching the rotor frame to the upper link of the tractor three point linkage, the upper attachment means also serving to attach the releasable frame to the rotor frame.

Figure 4:
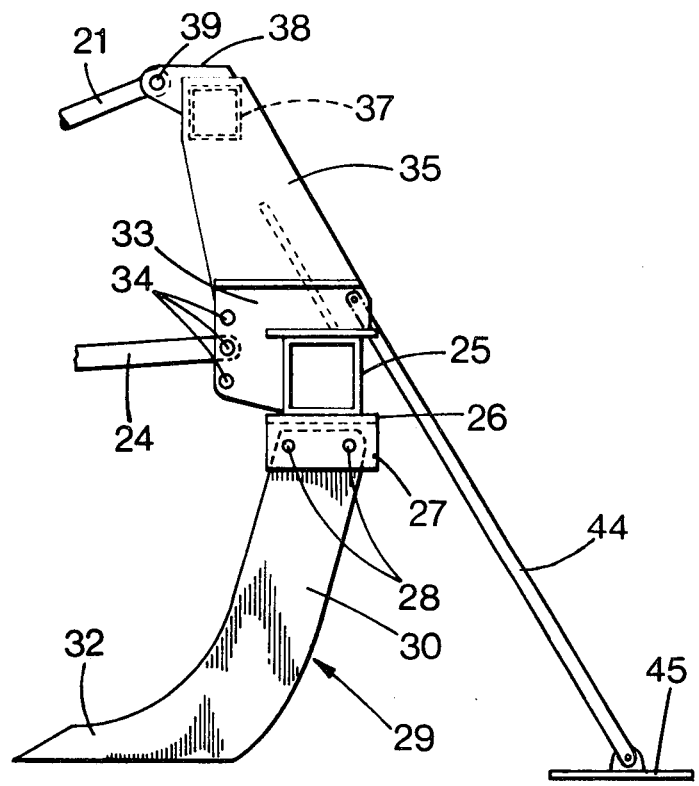

Further features of the invention appear from the following description of an embodiment of the invention given by way of example only and with reference to the accompanying drawings, in which:

FIG. 1 is a sectional end elevation of a cultivating implement fitting to a rotary cultivator, FIG. 2 is a rear elevation of the implement of FIG. 1, FIG. 3 is a plan view of the implement of FIG. 1, and FIG. 4 is a view of the cultivating implement of FIG. 1 fitted directly to a tractor three point linkage and with an auxiliary support bar in supporting position.

Referring to the drawings, a rotary cultivator comprises a transverse frame 10 having a top shield 11 located over a rotor shaft 12 on which are carried rotary cultivating tools (not shown) of known form, the tips of which move along a circular path 13 during rotation of the shaft 12. The frame 10 also includes a top plate 14 and transverse frame members 15, and the frame 10 and shaft 12 extend generally horizontally in use and at a right angle to the direction of travel indicated by arrow A. The frame 10 also includes side frame members 17 at each end of the frame and the members 17 support the ends of the shaft 12, and a tool bar 18 is secured at its ends to the side members 17.

A pair of spaced apart parallel bars 19 are secured to the upper side of the frame 10 and an A-frame 20 is secured to the bars 19 and extends upwardly to provide a forward support bracket 22 at its upper end for supporting the machine from the top link 21 of a conventional tractor three-point linkage. The A-frame 20 is additionally supported by bars 23 and the whole constitutes the 'top mast' of the rotary cultivator. The rotary cultivator also comprises transmission means (not shown) in known manner for transmitting drive from the tractor power take-off to the shaft 12. The bottom links 24 of the tractor three point linkage are attached to the forward ends of the bars 19, also in known manner as through brackets 19a.

A releasable cultivator frame is fitted to the rear of the rotary cultivator with respect to the direction of travel A and comprises a rigid frame including a transverse tool bar 25 in the form of a square-section tube. Securing brackets 26 are bolted at spaced intervals as desired along the tool bar 25 and the brackets 26 are each formed with lugs 27 projecting downwardly and providing bores 28 for bolting the upper end of a fixed cultivating tine 29 thereto.

The tines 29 are each formed with a shank portion 30 which extends forwardly and downwardly and terminates in a tooth portion 32 which lies below the path of travel 13 of the cultivating tools of the rotary cultivator.

The tool bar 25 also carries two forwardly-extending spaced brackets 33 each of which is formed with a series of vertically-spaced holes 34 for receiving a securing bolt (not shown) which passes through a selected one of said holes 34 and a hole formed on the rear end of the co-operating bar 19 on the rotary cultivator. Thus, depending on the holes 34 used to secure the brackets 33 to the bars 19, the frame can be releasably mounted on the rotary cultivator at a variable height relative to the cultivator.

Upwardly converging plates 35 are secured to the tool bar 25 and a bar 37 is secured between their upper ends. The bar 37 carries a pair of forwardly-extending brackets 38 each having a hole 39 through which is located a pin 40. An adjustable link 41 is pivotally mounted at one end on the pin 40 and at the other end to a pin 42 located through holes 43 formed in the rearward end of the support bracket 22 on the top mast. On adjustment of the length of the link 41, the implement may be pivoted about the horizontally disposed bolts securing the brackets 33 to the bars 19. This enables the disposition of the tines 29 to the vertical to be altered and the releasable frame to be secured in a selected pivoted position during operation.

It will be seen that the brackets 33 are supported on the brackets 26, and the plates 35 have holes for locating the bolts securing the brackets 33 to the bars 19.

The releasable frame is provided with support bars 44 (FIG. 4) pivotally attached to the rear end of the brackets 33 and each having a plate 46 at their end remote from the respective brackets. The bars 44 have a length such that they can be pivoted downwardly until the plate engages the ground behind the frame. The frame can then be supported on the tines 29 and the plates 45 when detached from the rotary cultivator by withdrawal of the bolts from the brackets 33 and 38. It will be appreciated that the implement may be mounted directly on the three point linkage of a tractor independently of the rotary cultivator as shown in FIG. 4, if desired because the attachment means on the releasable frame match the spacings and locations of the tractor three point linkage. This attachment is achieved by securing the lower links 24 of the three point linkage to the brackets 33 and the top link 21 to the brackets 38.

The invention provides a cultivator frame with fixed tines for use with a rotary cultivator, which can be readily attached to and detached from the rotary cultivator as desired and which can be used independently of the rotary cultivator.

What I claim as my invention and desire to secure by Letters Patent of the United States is:

1. A cultivating machine comprising, in combination: a rotary cultivator including a rotor frame and a rotor on said frame which carries rotary cultivating tools; first attachment means surmounting the rotor frame, said first attachment means including a first upper attachment device which attaches to the upper link of a tractor three point linkage, and first lower attachment devices which attach to the lower links of said three point linkage, said first lower attachment devices including fixed horizontal beams which extend rearwardly of the rotor frame; a fixed cultivator which includes a tool frame and fixed cultivating tools supported on said tool frame; and second attachment means mounted upon and extending forwardly from the tool frame, said second attachment means including a second upper attachment device which is detachably connected to said first upper attachment device in substantially the same horizontal plane as the latter, and said second attachment means also including second lower attachment devices which are detachably connected to the rear extremities of said horizontal beams in substantially the same horizontal plane as said first lower attachment devices; said second lower attachment means including means by which they may be attached to the rear extremities of the beams at a plurality of selected heights relative to said beams.

2. The combination of claim 1 in which the second lower support members comprise co-axial means about which the tool frame is pivotable, and which also includes a link of variable length detachably connected between the first and second upper attachment devices.

3. The combination of claim 1 in which the tool frame includes a pivotable support bar which pivots so that, together with the fixed cultivating tools, the bar serves to support the tool frame on the ground when detached from the rotor frame.

4. The combination of claim 1 in which the first upper attachment device has a forwardly extending portion and a rearwardly extending portion attachable, respectively, to the upper link of a tractor three point linkage and to said second attachment means, and which includes a link of variable length detachably connected to said rearwardly extending portion and to the upper attachment device of the second attachment means.

5. A cultivating machine comprising, in combination: a rotary cultivator including a rotor frame and a rotor on said frame which carries rotary cultivating tools; first attachment means surmounting the rotor frame, said first attachment means including a first upper attachment device which attaches to the upper link of a tractor three point linkage, and first lower attachment devices which attach to the lower links of said three point linkage, said first lower attachment devices including fixed horizontal beams which extend rearwardly of the rotor frame; a fixed cultivator which includes a tool frame and fixed cultivating tools supported on said tool frame; and second attachment means mounted upon and extending forwardly from the tool frame, said second attachment means including a second upper attachment device which is detachably connected to said first upper attachment device in substantially the same horizontal plane as the latter; said second upper attachment device including a forwardly extending detachable link of variable length which is detachably connected to the first upper attachment device.

6. The combination of claim 5 in which the second lower attachment devices include means about which the tool frame is pivotable relative to the rotor frame.

7. The combination of claim 5 in which the tool frame includes a pivotable support bar which pivots so that, together with the fixed cultivating tools, the bar serves to support the tool frame on the ground when detached from the rotor frame.

8. The combination of claim 5 in which the first upper attachment device has a forwardly extending portion and a rearwardly extending portion attachable, respectively, to the upper link of a tractor three point linkage and to said link of variable length.

* * * * *